United States Patent
Chang et al.

(10) Patent No.: US 8,300,053 B2
(45) Date of Patent: Oct. 30, 2012

(54) SYSTEM AND METHOD FOR FITTING IMAGES IN AN ELECTRONIC DEVICE

(75) Inventors: Chih-Kuang Chang, Taipei Hsien (TW); Xin-Yuan Wu, Shenzhen (CN); Min Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 474 days.

(21) Appl. No.: 12/646,878

(22) Filed: Dec. 23, 2009

(65) Prior Publication Data

US 2010/0328349 A1    Dec. 30, 2010

(30) Foreign Application Priority Data

Jun. 29, 2009  (CN) ........................ 2009 1 0303788.2

(51) Int. Cl.
 *G06T 11/00* (2006.01)
(52) U.S. Cl. ........ 345/468; 345/467; 345/619; 345/643; 345/660
(58) Field of Classification Search .................. 382/182, 382/190, 139
 See application file for complete search history.

(56) References Cited

U.S. PATENT DOCUMENTS

| | | | | |
|---|---|---|---|---|
| 5,304,988 A * | 4/1994 | Seto | ............................... | 382/224 |
| 5,708,727 A * | 1/1998 | Tanaka et al. | .................. | 382/156 |
| 6,577,330 B1 * | 6/2003 | Tsuda et al. | ................... | 715/782 |
| 6,661,919 B2 * | 12/2003 | Nicholson et al. | ............ | 382/173 |
| 2003/0115552 A1 * | 6/2003 | Jahnke et al. | .................. | 715/536 |
| 2004/0076320 A1 * | 4/2004 | Downs, Jr. | ..................... | 382/139 |
| 2005/0116945 A1 * | 6/2005 | Mochizuki et al. | ........... | 345/418 |
| 2007/0047819 A1 * | 3/2007 | Hull et al. | ...................... | 382/190 |
| 2007/0274590 A1 * | 11/2007 | Arai | ............................. | 382/187 |
| 2008/0002916 A1 * | 1/2008 | Vincent et al. | ................. | 382/305 |
| 2009/0005078 A1 * | 1/2009 | Dariel | ......................... | 455/456.2 |
| 2009/0110287 A1 * | 4/2009 | Bates et al. | .................... | 382/190 |
| 2010/0111419 A1 * | 5/2010 | Uehori | .......................... | 382/182 |
| 2010/0224112 A1 * | 9/2010 | Kahn | ........................ | 112/475.19 |
| 2010/0238205 A1 * | 9/2010 | Thomson et al. | ................. | 347/5 |

FOREIGN PATENT DOCUMENTS

CN    101140617    3/2008

* cited by examiner

*Primary Examiner* — Xiao M. Wu
*Assistant Examiner* — Phi Hoang
(74) *Attorney, Agent, or Firm* — Altis Law Group, Inc.

(57) ABSTRACT

An electronic device includes an image fitting system to fit an image to identify characters of the image and graphics of the image in the electronic device. Operations of fitting the image by the image fitting system includes generation of a standard character database to fit characters of the image, generation of character fitting results by fitting each character of the image according to the standard character database, and generation of graphic fitting results by fitting each graphic of the image according to a standard graphic that is defined by a graphic equation.

12 Claims, 6 Drawing Sheets

SYSTEM AND METHOD FOR FITTING IMAGES IN AN ELECTRONIC DEVICE

BACKGROUND

1. Technical Field

Embodiments of the present disclosure generally relate to techniques of processing images, and more particularly to a system and method for fitting images in an electronic device.

2. Description of Related Art

Fitting may be used to alter or regulate an image so as to achieve accuracy or conform the image to an image standard. For example, standard characters and standard graphics may be predetermined, so as to determine if a character of an image is identified to an acceptable character if the character is similar to a standard character, and/or a graphic of the image is identified to an acceptable graphic if the graphic is similar to a standard graphic. An electronic device, such as a computer, a server, or a mobile phone, for example, may be utilized to fit an image to identify acceptable characters and acceptable graphics of the image, and to output the acceptable characters and the acceptable graphics to a display unit of the electronic device for display.

In this manner, characters and graphics in the image in a file format, for example, PDF format, CAD (computer aided design) format, TIF format, JPG format, cannot be accurately identified. This method can be imprecise, leading to incorrect operation of fitting the image.

DETAILED DESCRIPTION

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, each "step" described above and below, is operative under the controlling of a corresponding "module". The word "module," as described herein, refers to logic embodied in hardware or firmware, or to a collection of software instructions, written in a programming language, such as, for example, Java, C, or assembly. One or more software instructions in the modules may be embedded in firmware, such as an EPROM. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
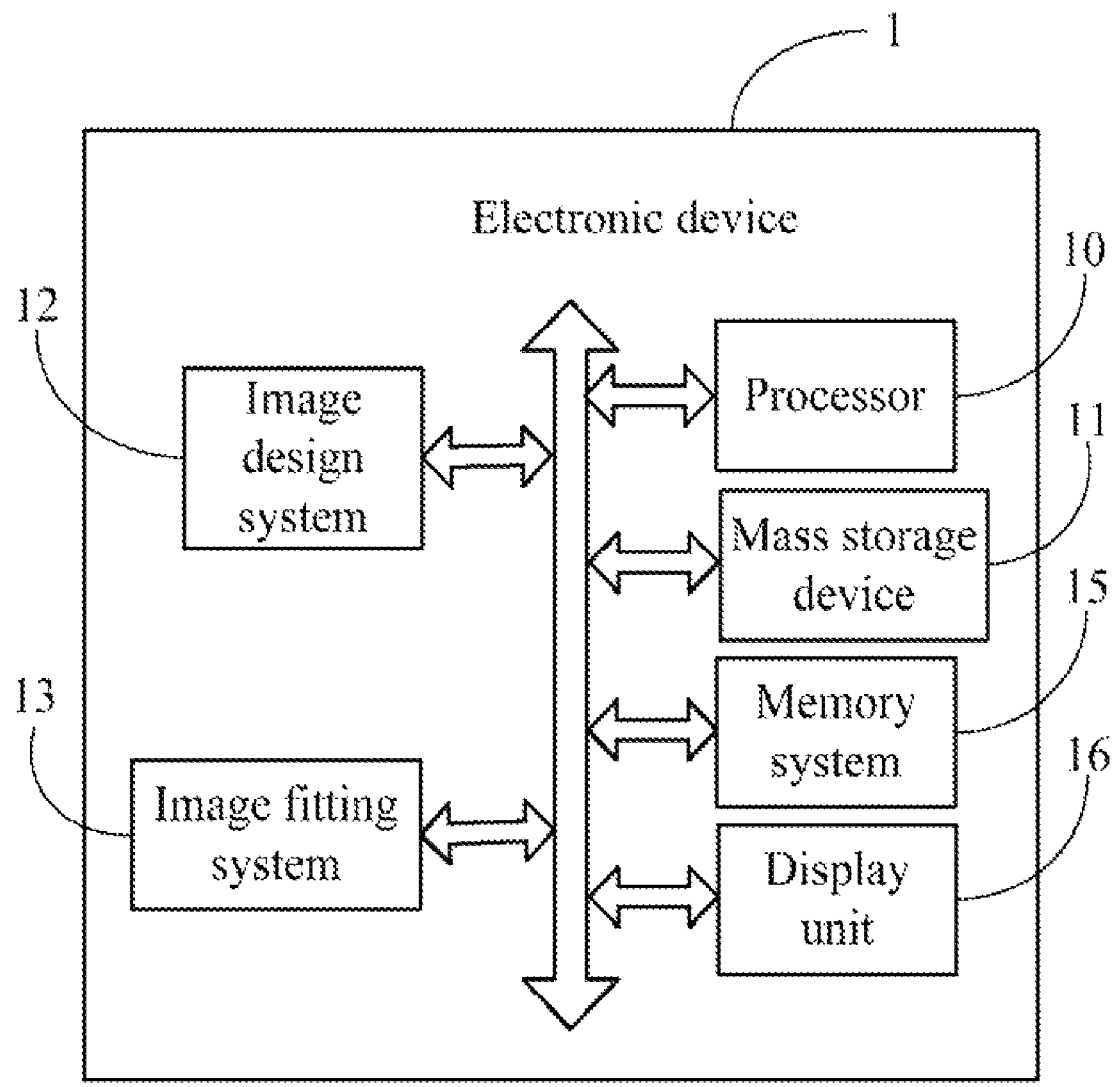
FIG. 1 is a block diagram of one embodiment of an electronic device for fitting an image.

FIG. 1 is a block diagram of one embodiment of an electronic device 1. The electronic device 1 may include an image design system 12 and an image fitting system 13. The image design system 12 may be used to design and store an image in the electronic device 1. The image fitting system 13 may be used to fit the image designed by the image design system 12. In the embodiment, the term "fit" is defined to the operation of altering or regulating an image so as to achieve accuracy or conforming the image to an image standard. For example, standard characters and standard graphics are predetermined, a character of an image is identified to an acceptable character if the character is similar to a standard character, and a graphic of the image is identified to an acceptable graphic if the graphic is similar to a standard graphic. The image design system 12 may be selected from the group of a computer aided design (CAD) system and/or a Microsoft Visio system.

The electronic device 1 may be a computer, a server, a mobile phone, or a personal digital assistant (PDA), for example. In the embodiment, the electronic device 1 may include a memory system 15, such as a random access memory (RAM) for temporary storage of information and/or a read only memory (ROM) for permanent storage of information, and/or a mass storage device 11, such as a hard drive, or optical media storage device. The mass storage device 11 may comprise one or more hard disk drives, optical drive, networked drive, or some combination of various digital storage systems. In the embodiment, the mass storage device 11 may store the image design system 12, the image fitting system 13, and at least one image designed by the image design system 12 and standard character data. The electronic device 1 also includes at least one processor 10 for computation, and a display unit 16 for displaying image fitting results. The memory system 15 or the mass storage device 11 may include one or more function modules to implement the image design system 12 and the image fitting system 13. The above mentioned components may be coupled by one or more communication buses or signal lines. It should be apparent that FIG. 1 is only one example of an architecture for the electronic device 1 that can be included with more or fewer components than shown, or a different configuration of the various components.

The electronic device 1 is generally controlled and coordinated by operating system software, such as the UNIX, Linux, Windows 95, 98, NT, 2000, XP, Vista, Mac OS X, an embedded operating system, or any other compatible operating systems. In other embodiments, the electronic device 1 may be controlled by a proprietary operating system.

Figure 2:
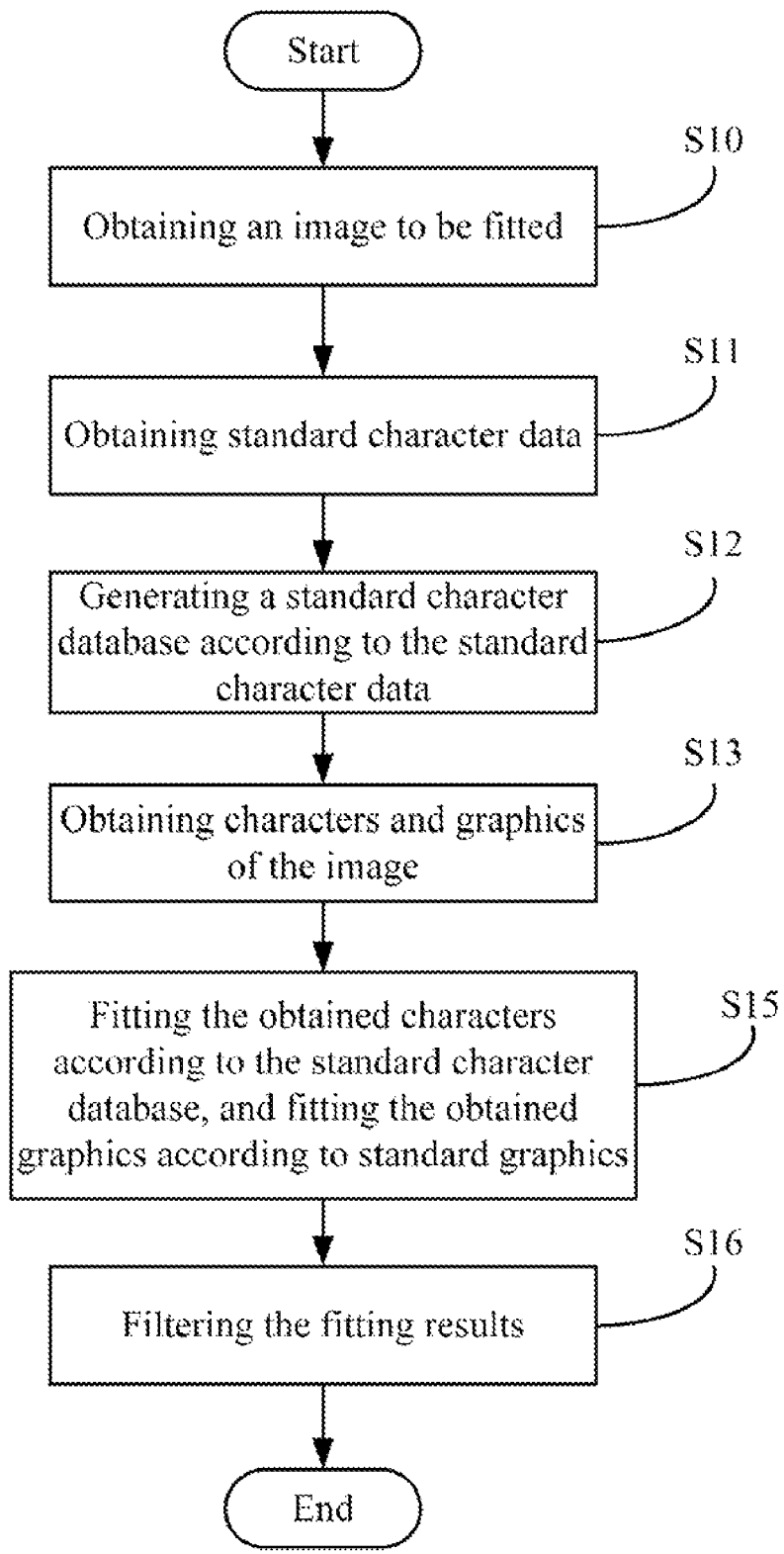
FIG. 2 is a flowchart illustrating one embodiment of a method for fitting an image.

FIG. 2 is a flowchart illustrating one embodiment of a method for fitting an image in the electronic device 1. In the embodiment, the image fitting system 13 comprise one or more computerized codes that are executable by the at least one processor 10 of the electronic device 1 to perform the method. Depending on the embodiment, additional blocks in the flow of FIG. 2 may be added, others removed, and the ordering of the blocks may be changed.

In block S10, the image fitting system 13 obtains an image from the mass storage device 11. In the embodiment, the image is stored in the mass storage device 11 and designed by utilizing the image design system 12. In other embodiments, the image is stored in the mass storage device 11 of the electronic device 1, and is designed by utilizing a software system that is installed and executable in another electronic device.

In block S11, the image fitting system 13 obtains standard character data from the mass storage device 11. The standard character data are stored in the mass storage device 11, and typically includes a plurality of characters that are formatted in American Standard Code for Information Interchange (ASCII) codes.

In block S12, the image fitting system 13 generates the standard character database according to the standard character data. The details of block S12 are described below in the description of FIG. 3.

In block S13, the image fitting system 13 obtains all characters and graphics of the obtained image. The details of block S13 are described below in the description of FIG. 5.

In block S15, the image fitting system 13 generates fitting results of the obtained image by fitting each of the obtained characters according to the standard character database, and by fitting each of the obtained graphics according to a standard graphic. The image fitting system 13 further displays image fitting results on the display unit 16 of the electronic device 1. In the embodiment, each of the obtained graphics corresponds to a standard graphic that is defined by a graphic equation. The details of block S15 are described below in the description of FIG. 6.

In block S16, the image fitting system 13 filters the image fitting results. In the embodiment, the image fitting system 13 filters the image fitting results by searching unacceptable characters and unacceptable graphics from the image and generating a fault result list that lists the searched unacceptable characters and unacceptable graphics. The filtering may further include displaying the fault result list on the display unit 16. Each of the unacceptable characters matches with none of the standard characters or matches with a plurality of standard characters. Each of the unacceptable graphics matches with none of the standard graphics or matches with a plurality of standard graphics.

Figure 3:
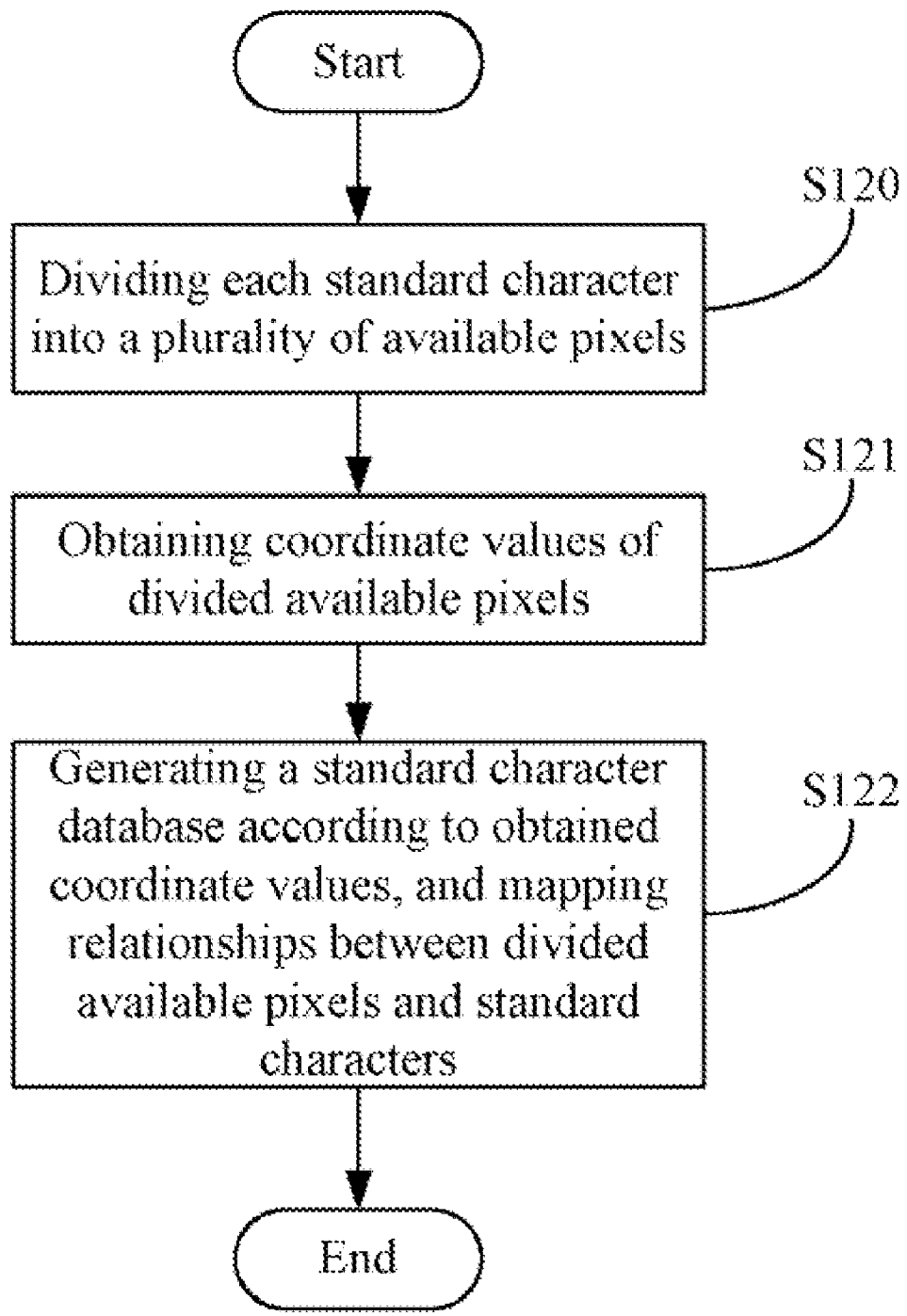
FIG. 3 is a flowchart illustrating one embodiment of a step S12 of FIG. 2.
Figure 4:
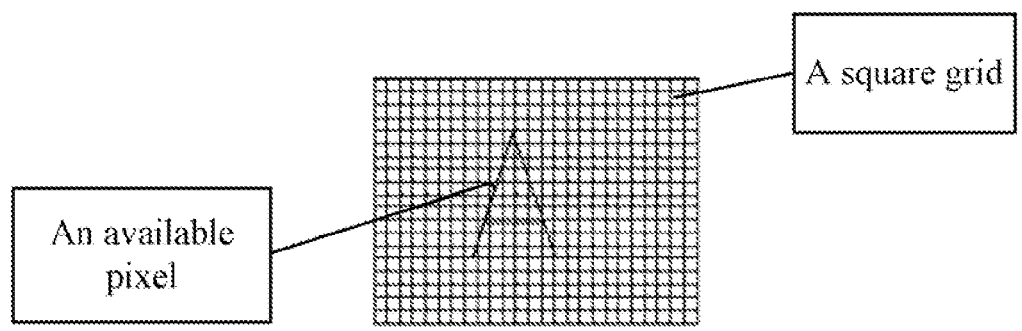
FIG. 4 is a flowchart illustrating one embodiment of operations of steps S120 and S121 of FIG. 3.

FIG. 3 is a flowchart illustrating one embodiment of the block S12 as described above. In block S120, the image fitting system 13 divides each of the standard characters into a plurality of available pixels, by utilizing a plurality of square grids that each has a predetermined side length. In one example with respect to FIG. 4, the standard character "A" is divided into a plurality of available pixels by utilizing a plurality of square grids. Each of the plurality of square grids that is dividing the standard character "A," denotes an available pixel of the standard character "A."

In block S121, the image fitting system 13 obtains a coordinate value for each of the divided available pixels. In block S122, the image fitting system 13 generates the standard character database according to obtained coordinate values, and maps relationships between divided available pixels and standard characters. For example, the image fitting system 13 obtains a coordinate value for an available pixel of the standard character "A." The standard character database may include the coordinate value of the available pixel of the standard character "A," and maps relationships between the available pixel and the standard character "A."

Figure 5:
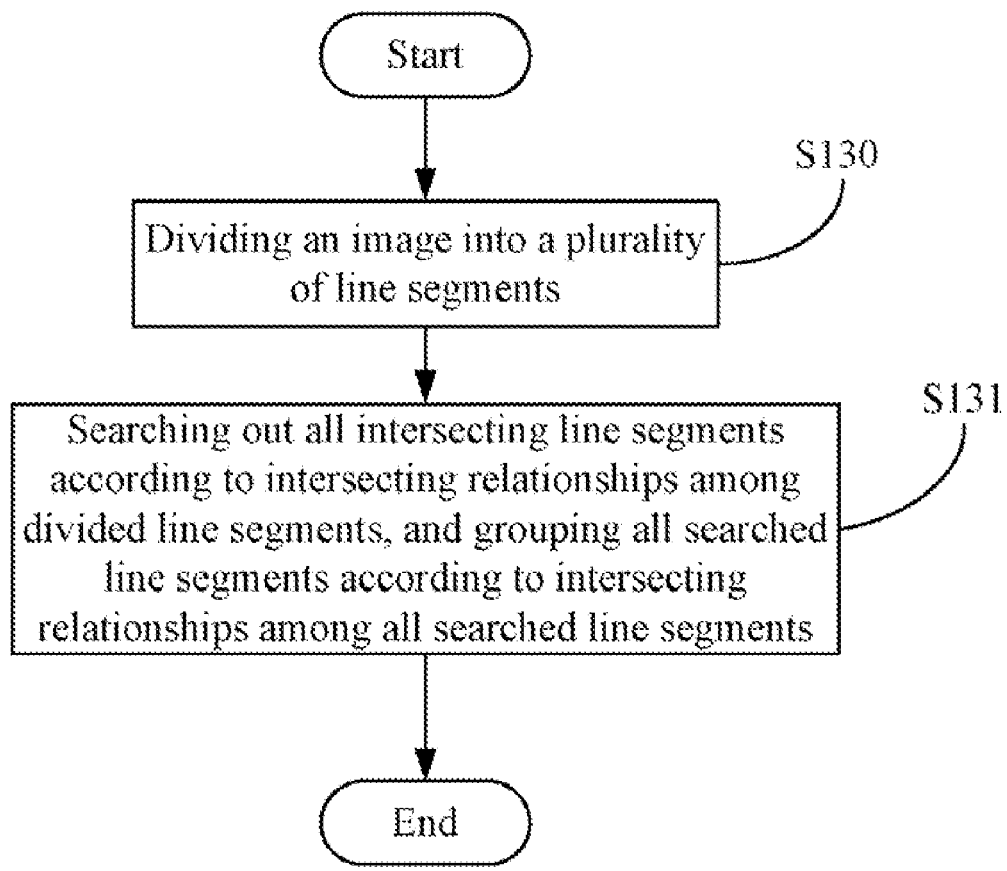
FIG. 5 is a flowchart illustrating one embodiment of a step S13 of FIG. 2.

FIG. 5 is a flowchart illustrating one embodiment of the step S13. In block S130, the image fitting system 13 divides the image into a plurality of line segments, by utilizing a plurality of square grids that each has a predetermined side length.

In block S131, the image fitting system 13 searches out all intersecting line segments from the image according to intersecting relationships among the plurality of line segments. In the embodiment, each of the searched intersecting line segments refers to a line segment that is intersecting with at least one another line segment. For example, a line segment "L1" may be intersecting with a line segment "L2," or two line segments "L2" and "L3," or more other line segments. The image fitting system 13 may search out the line segment "L1" as an intersecting line segment.

In block S131, the image fitting system 13 groups the intersecting line segments according to intersecting relationships among the intersecting line segments, to obtain at least one line segment group. Each of the at least one line segment group indicates a character or a graphic. The image fitting system 13 further outputs the at least one line segment group so as to obtain characters and graphics of the image. For example, each line segment of the standard character "A" may be intersecting with at least one another line segment of the standard character "A." Each line segment of the standard character "A" may be an intersecting line segment. Each line segment of the standard character "A" may not be intersecting with a line segment of another different standard character "B." The image fitting system 13 may group all line segments of the standard character "A," to obtain a line segment group of the standard character "A."

Figure 6:
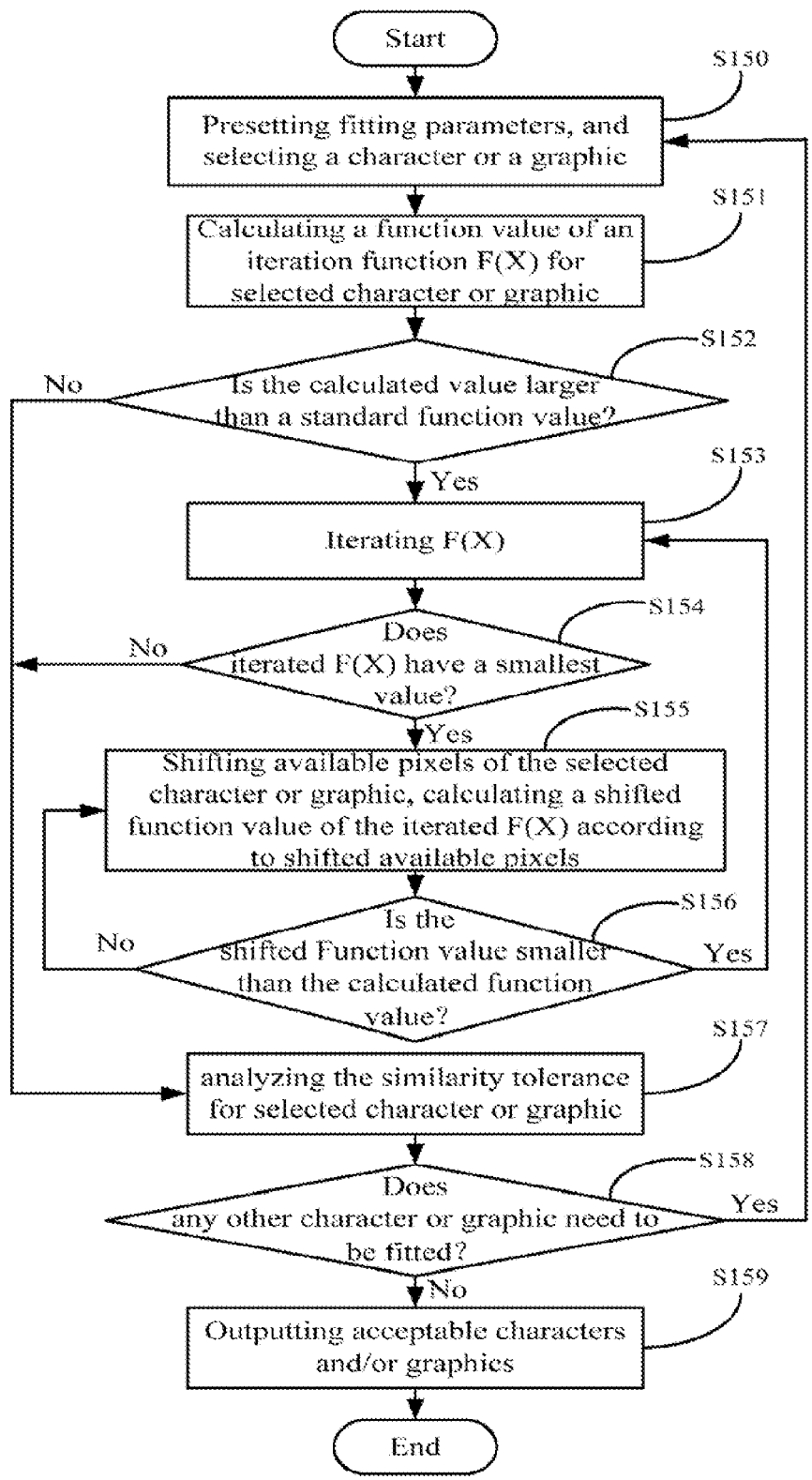
FIG. 6 is a flowchart illustrating one embodiment of a step S15 of FIG. 2.

FIG. 6 is a flowchart illustrating one embodiment of the step S15. In block S150, the image fitting system 13 presets a function standard value of an iteration function F(X), a similarity tolerance standard value, and an iteration step-length. The image fitting system 13 further selects a character or a graphic of the image from the obtained characters and graphics.

In block S151, the image fitting system 13 selects available pixels of selected character or selected graphic, and calculates a function value of the iteration function F(X) that selected available pixels relative to each of the standard characters or each of the standard graphics. A calculated function value corresponds to a standard character or a standard graphic. The iteration function F(X) is shown as follows:

$$F(X) \sum_{i=1}^{n} \sqrt{(X1-X2)^2 + (Y1-Y2)^2 + (Z1-Z2)^2} \Big/ n.$$

Here "X1" denotes a matrix, which arrays X-axis coordinate values of selected available pixels. "Y1" denotes a matrix, which arrays Y-axis coordinate values of the selected available pixels. "Z1" denotes a matrix, which arrays Z-axis coordinate values of the selected available pixels. "X2" denotes a matrix, which arrays X-axis coordinate values of available pixels of a standard character or a standard graphic. "Y2" denotes a matrix, which arrays Y-axis coordinate values of the available pixels of the standard character or the standard graphic. "Z2" denotes a matrix, which arrays Z-axis coordinate values of the available pixels of the standard character or the standard graphic. In the embodiment, the available pixels of the standard character or the standard graphic correspond to the selected pixels.

In block S152, the image fitting system 13 analyzes whether the calculated function value is larger than the function standard value. If the calculated function value is smaller than or equal to the function standard value, the flow goes to block S157 as described below.

Otherwise, if the calculated function value is larger than the function standard value, in block S153, the image fitting system 13 generates an iterated iteration function by iterating the iteration function F(X) according to the least-squares Newton iteration method.

In block S154, the image fitting system 13 analyzes whether the iterated iteration function has a smallest function value. If the iterated iteration function has not the smallest function value, the flow goes to block S157 as described below.

Otherwise, if the iterated iteration function has the smallest function value, in block S155, the image fitting system 13 shifts the selected available pixels according to the iteration step-length, and calculates a shifted function value of the iterated iteration function that shifted available pixels relative to a standard character or a standard graphic. The standard character or the standard graphic corresponds to the calculated function value of the iteration function F(X).

In block S156, the image fitting system 13 analyzes whether the shifted function value is smaller than the calculated function value. If the shifted function value is smaller than the calculated function value, the flow returns to block S153 as described above. Otherwise, if the shifted function value is larger than or equal to the calculated function value, the flow returns to block S155 as described above.

In block S157, the image fitting system 13 outputs the calculated function value or the shifted function value. The image fitting system 13 further analyzes the similarity tolerance between the selected obtained character and the corresponding standard character, or the selected obtained graphic and the corresponding standard graphic according to the similarity tolerance standard value, to obtain an acceptable character or an acceptable graphic.

In block S158, the image fitting system 13 analyzes whether all obtained characters and all obtained graphics of the image are fitted. If an obtained character or an obtained graphic of the received image has not be fitted, the flow returns to block S150 as described above.

Otherwise, if all obtained characters and all obtained graphics of the image are fitted, in block S159, the image fitting system 13 outputs all acceptable characters and all acceptable graphics to the display unit 16 of the electronic device 1 for display.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. An electronic device, comprising:
   at least one storage system and at least one processor; and
   an image fitting system stored in the at least one storage system, and being executable by the at least one processor to perform steps of:
   (i1) obtaining an image from the at least one storage system;
   (i2) obtaining standard character data from the at least one storage system;
   (i3) generating a standard character database according to the standard character data;
   (i4) obtaining all characters and graphics of the image;
   (i5) generating image fitting results of the image by fitting each of the obtained characters according to the standard character database, and by fitting each of the obtained graphics according to a standard graphic, each of the graphics corresponding to a standard graphic that is defined by a graphic equation;
   (i6) displaying the image fitting results on a display unit of the electronic device; and
   (i7) filtering the image fitting results, comprising:
   searching out unacceptable characters and unacceptable graphics, each of the unacceptable characters matching with none of standard characters or matches with a plurality of standard characters, and each of the unacceptable graphics matching with none of standard graphics or matches with a plurality of standard graphics;
   generating a fault result list that lists searched unacceptable characters and unacceptable graphics; and
   displaying the fault result list on the display unit.

2. The electronic device as described in claim 1, wherein the step (i3) further comprises:
   dividing each standard character into a plurality of available pixels, by utilizing a plurality of square grids that each has a predetermined side length;
   obtaining a coordinate value for each of the plurality of available pixels; and
   generating a standard character database according to obtained coordinate values of the plurality of available pixels, and mapping relationships between the plurality of available pixels and standard characters.

3. The electronic device as described in claim 1, wherein the step (i4) further comprises:
   dividing the image into a plurality of line segments;
   searching out all intersecting line segments according to intersecting relationships among the plurality of line segments, wherein each of searched intersecting line segments refers to a line segment that is intersecting with at least one another line segment;
   grouping the searched intersecting line segments according to intersecting relationships among the searched intersecting line segments, to obtain at least one line segment group, wherein each of the at least one line segment group indicates a character or a graphic; and
   outputting the at least one line segment group.

4. The electronic device as described in claim 1, wherein the step (i5) further comprises:
   (i51) presetting a function standard value of an iteration function, a similarity tolerance standard value, and an iteration step-length;
   (i52) selecting a character or a graphic from obtained characters and graphics, selecting available pixels of selected character or selected graphic, and calculating a function value of the iteration function that selected available pixels relative to each standard character or each standard graphic, wherein each calculated function value corresponds to a standard character or a standard graphic;
   (i53) analyzing whether a calculated function value is larger than the function standard value, and going to step (i59) if the calculated function value is smaller than or equal to the function standard value, or going to step (i55) if the calculated function value is larger than the function standard value;
   (i55) iterating the iteration function by utilizing a least-squares Newton iteration method, to generate an iterated iteration function;
   (i56) analyzing whether the iterated iteration function has a smallest function value, and going to step (i57) if the iterated iteration function has the smallest function value, or going to step (i59) if the iterated iteration function has not the smallest function value;
   (i57) shifting the selected available pixels according to the iteration step-length, and calculating a shifted function value of the iterated iteration function that shifted available pixels relative to a standard character or a standard graphic, wherein the standard character or the standard graphic corresponds to the calculated function value;
   (i58) analyzing whether the shifted function value is smaller than the calculated function value, and going to step (i55) if the shifted function value is smaller than the calculated function value, or going to step (i57) if the shifted function value is larger than or equal to the calculated function value;

(i59) outputting the calculated function value or the shifted function value, and analyzing the similarity tolerance between the selected character and the standard character, or the selected graphic and the standard graphic according to the similarity tolerance standard value, to obtain an acceptable character or an acceptable graphic;

(i60) repeatedly performing the steps (i52)-(i59) until all obtained characters of the image and all obtained graphics of the image are fitted; and (i61) outputting all acceptable characters and all acceptable graphics to the display unit for display.

5. A computer-implemented method for fitting an image in an electronic device, the method comprising:

(i1) obtaining an image from the at least one storage system;

(i2) obtaining standard character data from the at least one storage system;

(i3) generating a standard character database according to the standard character data;

(i4) obtaining all characters and graphics of the image;

(i5) generating image fitting results of the image by fitting each of the obtained characters according to the standard character database, and by fitting each of the obtained graphics according to a standard graphic, each of the graphics corresponding to a standard graphic that is defined by a graphic equation;

(i6) displaying the image fitting results on a display unit of the electronic device; and (i7) filtering the image fitting results, comprising:
searching out unacceptable characters and unacceptable graphics, each of the unacceptable characters matching with none of standard characters or matches with a plurality of standard characters, and each of the unacceptable graphics matching with none of standard graphics or matches with a plurality of standard graphics;
generating a fault result list that lists searched unacceptable characters and unacceptable graphics; and
displaying the fault result list on the display unit.

6. The method as described in claim 5, wherein the step (i3) further comprises:
dividing each standard character into a plurality of available pixels, by utilizing a plurality of square grids that each has a predetermined side length;
obtaining a coordinate value for each of the plurality of available pixels; and
generating a standard character database according to obtained coordinate values of the plurality of available pixels, and mapping relationships between the plurality of available pixels and standard characters.

7. The method as described in claim 5, wherein the step (i4) further comprises:
dividing the image into a plurality of line segments;
searching out all intersecting line segments according to intersecting relationships among the plurality of line segments, wherein each of searched intersecting line segments refers to a line segment that is intersecting with at least one another line segment;
grouping the searched intersecting line segments according to intersecting relationships among the searched intersecting line segments, to obtain at least one line segment group, wherein each of the at least one line segment group indicates a character or a graphic; and
outputting the at least one line segment group.

8. The method as described in claim 5, wherein the step (i5) further comprises:

(i51) presetting a function standard value of an iteration function, a similarity tolerance standard value, and an iteration step-length;

(i52) selecting a character or a graphic from obtained characters and graphics, selecting available pixels of selected character or selected graphic, and calculating a function value of the iteration function that selected available pixels relative to each standard character or each standard graphic, wherein each calculated function value corresponds to a standard character or a standard graphic;

(i53) analyzing whether a calculated function value is larger than the function standard value, and going to step (i59) if the calculated function value is smaller than or equal to the function standard value, or going to step (i55) if the calculated function value is larger than the function standard value;

(i55) iterating the iteration function by utilizing a least-squares Newton iteration method, to generate an iterated iteration function;

(i56) analyzing whether the iterated iteration function has a smallest function value, and going to step (i57) if the iterated iteration function has the smallest function value, or going to step (i59) if the iterated iteration function has not the smallest function value;

(i57) shifting the selected available pixels according to the iteration step-length, and calculating a shifted function value of the iterated iteration function that shifted available pixels relative to a standard character or a standard graphic, wherein the standard character or the standard graphic corresponds to the calculated function value;

(i58) analyzing whether the shifted function value is smaller than the calculated function value, and going to step (i55) if the shifted function value is smaller than the calculated function value, or going to step (i57) if the shifted function value is larger than or equal to the calculated function value;

(i59) outputting the calculated function value or the shifted function value, and analyzing the similarity tolerance between the selected character and the standard character, or the selected graphic and the standard graphic according to the similarity tolerance standard value, to obtain an acceptable character or an acceptable graphic;

(i60) repeatedly performing the steps (i52)-(i59) until all obtained characters of the image and all obtained graphics of the image are fitted; and (i61) outputting all acceptable characters and all acceptable graphics to the display unit for display.

9. A non-transitory storage medium having stored thereon instructions that, when executed by a processor of an electronic device, causing the electronic device to perform a method for fitting an image, wherein the method comprises:

(i1) obtaining an image from the at least one storage system;

(i2) obtaining standard character data from the at least one storage system;

(i3) generating a standard character database according to the standard character data;

(i4) obtaining all characters and graphics of the image;

(i5) generating image fitting results of the image by fitting each of the obtained characters according to the standard character database, and by fitting each of the obtained graphics according to a standard graphic, each of the graphics corresponding to a standard graphic that is defined by a graphic equation;

(i6) displaying the image fitting results on a display unit of the electronic device; and (i7) filtering the image fitting results comprising:
    searching out unacceptable characters and unacceptable graphics, each of the unacceptable characters matching with none of standard characters or matches with a plurality of standard characters, and each of the unacceptable graphics matching with none of standard graphics or matches with a plurality of standard graphics;
    generating a fault result list that lists searched unacceptable characters and unacceptable graphics; and
    displaying the fault result list on the display unit.

10. The non-transitory storage medium as described in claim 9, wherein the step (i3) further comprises:
    dividing each standard character into a plurality of available pixels, by utilizing a plurality of square grids that each has a predetermined side length;
    obtaining a coordinate value for each of the plurality of available pixels; and
    generating a standard character database according to obtained coordinate values of the plurality of available pixels, and mapping relationships between the plurality of available pixels and standard characters.

11. The non-transitory storage medium as described in claim 9, wherein the step (i4) further comprises:
    dividing the image into a plurality of line segments;
    searching out all intersecting line segments according to intersecting relationships among the plurality of line segments, wherein each of searched intersecting line segments refers to a line segment that is intersecting with at least one another line segment;
    grouping the searched intersecting line segments according to intersecting relationships among the searched intersecting line segments, to obtain at least one line segment group, wherein each of the at least one line segment group indicates a character or a graphic; and
    outputting the at least one line segment group.

12. The non-transitory storage medium as described in claim 9, wherein the step (i5) further comprises:
    (i51) presetting a function standard value of an iteration function, a similarity tolerance standard value, and an iteration step-length;
    (i52) selecting a character or a graphic from obtained characters and graphics, selecting available pixels of selected character or selected graphic, and calculating a function value of the iteration function that selected available pixels relative to each standard character or each standard graphic, wherein each calculated function value corresponds to a standard character or a standard graphic;
    (i53) analyzing whether a calculated function value is larger than the function standard value, and going to step (i59) if the calculated function value is smaller than or equal to the function standard value, or going to step (i55) if the calculated function value is larger than the function standard value;
    (i55) iterating the iteration function by utilizing a least-squares Newton iteration method, to generate an iterated iteration function;
    (i56) analyzing whether the iterated iteration function has a smallest function value, and going to step (i57) if the iterated iteration function has the smallest function value, or going to step (i59) if the iterated iteration function has not the smallest function value;
    (i57) shifting the selected available pixels according to the iteration step-length, and calculating a shifted function value of the iterated iteration function that shifted available pixels relative to a standard character or a standard graphic, wherein the standard character or the standard graphic corresponds to the calculated function value;
    (i58) analyzing whether the shifted function value is smaller than the calculated function value, and going to step (i55) if the shifted function value is smaller than the calculated function value, or going to step (i57) if the shifted function value is larger than or equal to the calculated function value;
    (i59) outputting the calculated function value or the shifted function value, and analyzing the similarity tolerance between the selected character and the standard character, or the selected graphic and the standard graphic according to the similarity tolerance standard value, to obtain an acceptable character or an acceptable graphic;
    (i60) repeatedly performing the steps (i52)-(i59) until all obtained characters of the image and all obtained graphics of the image are fitted; and
    (i61) outputting all acceptable characters and all acceptable graphics to the display unit for display.

* * * * *